United States Patent [19]

Imai et al.

[11] 4,261,403
[45] Apr. 14, 1981

[54] RADIAL TIRES HAVING IMPROVED IRREGULAR WEAR RESISTANCE EMPLOYING LIQUID POLYMER AS PROCESSING AND REINFORCING AID IN TREAD RUBBER

[75] Inventors: Isamu Imai, Kodaira; Junichi Ohtsuka, Higashikurume, both of Japan

[73] Assignee: Bridgestone Tire Co., Ltd., Tokyo, Japan

[21] Appl. No.: 76,536

[22] Filed: Sep. 18, 1979

[30] Foreign Application Priority Data

Sep. 18, 1978 [JP] Japan .................................. 53/114782

[51] Int. Cl.³ .......................... B60C 9/18; B60C 11/00
[52] U.S. Cl. ........................... 152/209 R; 152/330 R; 152/357 R; 152/360; 152/361 R; 152/374; 260/33.6 AQ; 525/232; 525/241; 525/236
[58] Field of Search ............... 152/209, 330 R, 357 R, 152/357 A, 358, 359, 360, 361 R, 361 OM, 361 FP, 374; 260/33.6 A, 33.6 AQ; 525/232, 241, 236; 428/495, 519

[56] References Cited

U.S. PATENT DOCUMENTS

| | | | |
|---|---|---|---|
| 3,563,922 | 2/1971 | Massoubre | 525/236 X |
| 3,830,275 | 8/1974 | Russell | 152/209 R X |
| 3,902,542 | 9/1975 | Imamura et al. | 152/374 X |

OTHER PUBLICATIONS

"Plasticizers, Softeners, and Extenders", Rubber Technology and Manufacture, Ed. C. M. Blow, C.R.C., 1971, pp. 198–203.

*Primary Examiner*—John T. Goolkasian
*Assistant Examiner*—Lois E. Boland
*Attorney, Agent, or Firm*—Sughrue, Rothwell, Mion, Zinn and Macpeak

[57] ABSTRACT

Radial tires having improved irregular wear resistance, which are reinforced with a belt cord layer and a carcass cord layer, characterized in that as the embedding rubber of the belt cord layer, use is made of natural rubber, polyisoprene rubber or a blend rubber consisting of said rubber and less than 30 parts by weight of at least one of polybutadiene rubber and styrene-butadiene copolymer rubber and that for the ground contact area of the tread of tire, a rubber composition consisting of 100 parts by weight of styrene-butadiene copolymer rubber having a viscosity average molecular weight of not less than $2 \times 10^5$ or a blend rubber consisting of more than 50 parts by weight of said copolymer rubber and at least one of natural rubber, polyisoprene rubber and polybutadiene rubber, 5–60 parts by weight of at least one of a liquid styrene-butadiene copolymer, a liquid polyisoprene polymer and a liquid polybutadiene polymer having a viscosity average molecular weight of $5 \times 10^3 – 7 \times 10^4$, and 40–90 parts by weight of a carbon black, is used.

10 Claims, 3 Drawing Figures

RADIAL TIRES HAVING IMPROVED IRREGULAR WEAR RESISTANCE EMPLOYING LIQUID POLYMER AS PROCESSING AND REINFORCING AID IN TREAD RUBBER

The present invention relates to tires for truck; bus or tires for light truck, particularly to radial tires having highly improved irregular wear resistance.

In general, it has been known that the tread rubber composed of styrene-butadiene copolymer rubber (SBR) is more excellent in the wear resistance and irregular wear resistance under severe conditions, such as at high temperature or upon high slip than the tread rubber composed of natural rubber and the former tread rubber is higher in the wet skid resistance, so that said tread rubber has been broadly used for tires for passenger cars.

On the other hand, for tires for truck-bus (TB tire) or tires for light truck (LT tire), since they are thick in the thickness of tread, the tread rubber of natural rubber has been generally used in view of the heat generation. Recently, the radial structure having excellent moving ability and durability has been popularly used in view of safety and economy but the irregular wear phenomena (shoulder stepdown wear, shoulder wave wear, rib edge stepdown wear at a part of the center) of the tread, which have never become problem in the tire of the conventional bias structure, have become a great problem. Particular, when these irregular wear phenomena occur, the wear life (primary life, wear life until the tire is reclaimed) of tires becomes very short and the vibrating ride feeling is adversely affected. Therefore, heretofore, in order to improve these irregular wear phenomena, the device in the tread pattern and the device in the structure for improving the uniformity of ground contact pressure at the ground contact area of the tread have been made but the improvement has never been heretofore fully satisfied.

Accordingly, it has been considered that the tread rubber consisting mainly of SBR which has been heretofore mainly used for tires of passenger cars, is used for TB tire or LT tire but when such tread rubber is applied to TB tire or LT tire, for example, such tread rubber is generally high in the self heat generation against the external dynamic stimulation due to the fundamental property of SBR and the vulcanized rubber is liable to generate high heat and when the tread rubber composed of SBR is used for TB tire having a large thickness of tread, a hindrance such as separation due to heat generation is caused. Furthermore, in the unvulcanized state, the scorching is apt to be caused and the operability in production is very poor, so that a large amount of process oil is generally mixed in practice. However, when the tread rubber consisting mainly of SBR in which a large amount of process oil is mixed, is used, the process oil transfers into the belt portion or carcass portion of the tire during running or storage to reduce the modulus of rubber at the belt end portion of the tire or to promote the lowering of the adhesive force between the cord and the rubber and the safety and the durable life are considerably damaged, so that yet there are a large number of problems to be solved and the use of SBR for TB or LT tire treads has a large number of problems.

The inventors have paid attention to liquid polymers having low molecular weights which are considered to be capable of crosslinking as a three dimensional effective network upon vulcanizing, as a process oil for improving the above described drawbacks, and have made earnest study and have found that when the molecular weight of the liquid polymers is small, the crosslinking is difficult and therefore said polymers readily transfer into a rubber, while when the molecular weight becomes larger, the transferring becomes difficult but the operability in production becomes poor. From this fact, it has been found that the drawbacks of lowering of modulus of the rubber at the belt end portion and lowering of the adhesive force between the cords and the rubber can be solved by using in the tread rubber a liquid polymer which is not too large in the molecular weight and has a more or less problem in the transferring property to improve the operability and using a rubber consisting mainly of natural rubber which is poor in the compatibility to the liquid polymer which partly transfers to the belt portion, for the embedding rubber of the belt cord layer.

The present invention consists in radial tires having improved irregular wear resistance, which are reinforced with a belt cord layer and a carcass cord layer, characterized in that as the embedding rubber of the belt cord layer, use is made of natural rubber, polyisoprene rubber or a blend rubber consisting of said rubber and less than 30 parts by weight of at least one of polybutadiene rubber and styrene-butadiene copolymer rubber and that for at least the ground contact area of the tread of tire, a rubber composition consisting of 100 parts by weight of styrene-butadiene copolymer rubber having a viscosity average molecular weight of not less than $2 \times 10^5$ or a blend rubber consisting of more than 50 parts by weight of said copolymer rubber and at least one of natural rubber, polyisoprene rubber and polybutadiene rubber, 5–60 parts by weight of at least one of a liquid styrene-butadiene copolymer, a liquid polyisoprene polymer and a liquid polybutadiene polymer having a viscosity average molecular weight of $5 \times 10^3$–$7 \times 10^4$, and 40–90 parts by weight of a carbon black, is used.

In the present invention, the embedding rubber of the belt cord layer is preferred to be natural rubber or polyisoprene rubber in view of the heat generation and the adhesion to the cords but depending upon the liquid polymer to be used for the ground contact area of the tread, natural rubber or polyisoprene rubber may be mixed with polybutadiene rubber or styrene-butadiene copolymer rubber. However, the mixed amount is less than 30 parts by weight among 100 parts by weight of the rubber considering the above described heat generation.

In the present invention, at at least the ground contact area of the tread, use is made of styrene-butadiene copolymer rubber having a viscosity average molecular weight of not less than $2 \times 10^5$ but if necessary, less than 50 parts by weight, preferably less than 25 parts by weight of at least one of natural rubber, polyisoprene rubber and polybutadiene rubber may be blended among 100 parts by weight of the rubber.

In the present invention, the liquid polymers to be used at the ground contact area of the tread are liquid styrene-butadiene copolymer, liquid polybutadiene polymer or liquid polyisoprene polymer having the viscosity average molecular weight of $5 \times 10^3$–$7 \times 10^4$, preferably, liquid styrene-butadiene copolymer or liquid polybutadiene polymer, more particularly the liquid styrene-butadiene copolymer having the same structure. When the molecular weight is less than $5 \times 10^3$, an amount of the liquid polymer which is not cross-linked by vulcanization, becomes larger and the polymer transfers in the rubber and the physical properties, particularly the heat generating property and the wear resistance of the vulcanized rubber lower, so that such liquid polymers are not preferable, and when the molecular weight is more than $7\times10^4$, the heat generation under the unvulcanized state is high, the scorching phenomenon is apt to occur and the operability in production is low, and therefore such liquid polymers are not preferable. An amount of the liquid polymer compounded is 5-60 parts by weight, preferably 5-30 parts by weight based on 100 parts by weight of the rubber. If the amount is less than 5 parts by weight, there is substantially no effect for preventing the heat generation under the unvulcanized state, and when the amount is more than 60 parts by weight, compounding ingredients, such as carbon black are not sufficiently dispersed due to the roller sticking and the insufficient shearing of Banbury mixer upon mixing.

In the present invention, an amount of carbon black compounded in the rubber composition to be used at the ground contact area of the tread is 40-90 parts by weight based on 100 parts by weight of the rubber composition. When the amount is less than 40 parts by weight, the wear resistance lowers and when the amount is more than 90 parts by weight, the operability lowers and there is problem in the heat generation under the unvulcanized state and the vulcanized state carbon blacks having (iodine adsorption value) IA of 83-150 mg/g and DBP (dibutyl phthalate absorption value) of 80-120 ml/100 g provided the more preferable results as the carbon black.

If a base rubber is arranged between the ground contact area of the tread and the belt cord layer, the transferring of the liquid polymer into the embedding rubber of the belt cord layer can be completely prevented. As the base rubber to be used in this case, natural rubber or polyisoprene rubber is used for preventing the heat generation after vulcanization and the transferring of the liquid polymer into the belt portion. Depending upon the kind of the liquid polymer to be used for the ground contact area of the tread, not more than 20 parts by weight based on 100 parts by weight of the rubber of styrene-butadiene copolymer rubber or polybutadiene rubber may be mixed. When the styrene-butadiene copolymer rubber becomes more than 20 parts by weight, the above described heat generating property becomes worse and when the polybutadiene rubber becomes more than 20 parts by weight, the dispersability of carbon black becomes poor. The thickness of the base rubber is preferred be less than ½ of the thickness of the tread.

In the present invention, the amount of carbon black to be used for the base rubber compounded is 20-50 parts by weight based on 100 parts by weight of the rubber. When the amount is less than 20 parts by weight, the wear resistance and the cut resistance are poor, so that a problem occurs in running in the state where the base rubber exposes to the ground contact surface at the wear end period of tire and when the amount is more than 50 parts by weight, the heat generating property which is most important for the base rubber, becomes worse, so that such amounts are not preferable.

When the carbon black is one having IA of 83-110 mg/g and DBP of 80-115 ml/100 g, the more preferable results can be obtained.

In the present invention, not more than 10 parts by weight of process oil, which is used in the general rubber industry, may be compounded in order to improve the operability under unvulcanized state.

The cords used for the belt layer and the carcass layer in the present invention include organic fiber cords, such as nylon fiber cords, polyester fiber cord, aromatic polyamide fiber cords, steel cords or glass cords.

The present invention will be explained in more detail.

For better understanding of the invention, reference is taken to the accompanying drawings, wherein.

The following examples are given for the purpose of illustration of this invention and are not intended as limitations thereof.

EXAMPLE 1

Figure 1:
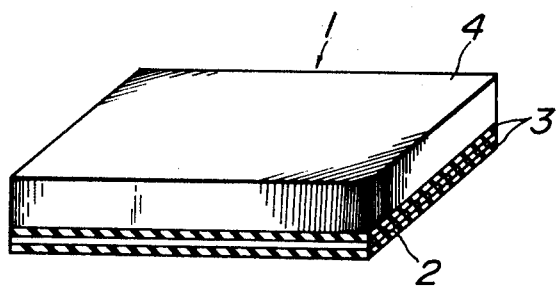
FIG. 1 is a perspective view of the sample for testing the rate of the liquid polymer compounded in the cap rubber transferring into the embedding rubber in Example 1.
Figure 2:
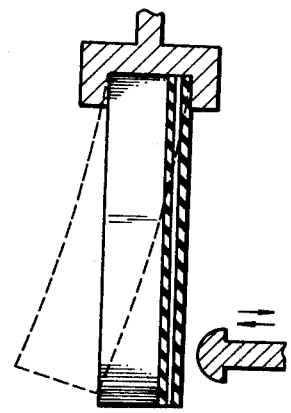
FIG. 2 is a schematic view for explaining the state of the transferring test of the liquid polymer of the sample in FIG. 1.

As shown in FIG. 1, steel cord layer 2 (length 300 mm×breadth 150 mm×thickness 1 mm) arranged in parallel with one another was embedded in two layers of embedding rubber 3 (thickness: 2 mm) having the composition as shown in Table 1 and a cap rubber 4 (thickness: 15 mm) having the composition as shown in Table 2 was arranged on the rubber layer embedding the steel cord layer to prepare a sample 1 and the transferring rate of the liquid polymer (viscosity average molecular weight: $1\times10^4$) in the cap rubber 4 was checked by the blend ratio of natural rubber and a styrene-butadiene copolymer rubber to be used for the embedding rubber. The measurement was effected as follows. Sample 1 was vulcanized at 145° C. for 45 minutes and then one end of the sample 1 was fixed as shown in FIG. 2 and to another end of the sample, a strain of 30 Hz and 80 mm was applied repeatedly and this treatment was continuously conducted at a temperature of 80° C.±2° C. for 30 days. Then, a given amount of the embedding rubber at the center portion of the sample 1 was taken out and boiled in a mixed solvent of acetone/chloroform (50%/50%) or THF (tetrahydrofuran) for 48 hours to take out the extract. The weight of the extract was measured and the rate of the liquid polymer amount which transferred into the embedding rubber 3 based on the original compounding amount of the liquid polymer compounded in the cap rubber 4 was determined. The result is shown in FIG. 3.

Figure 3:
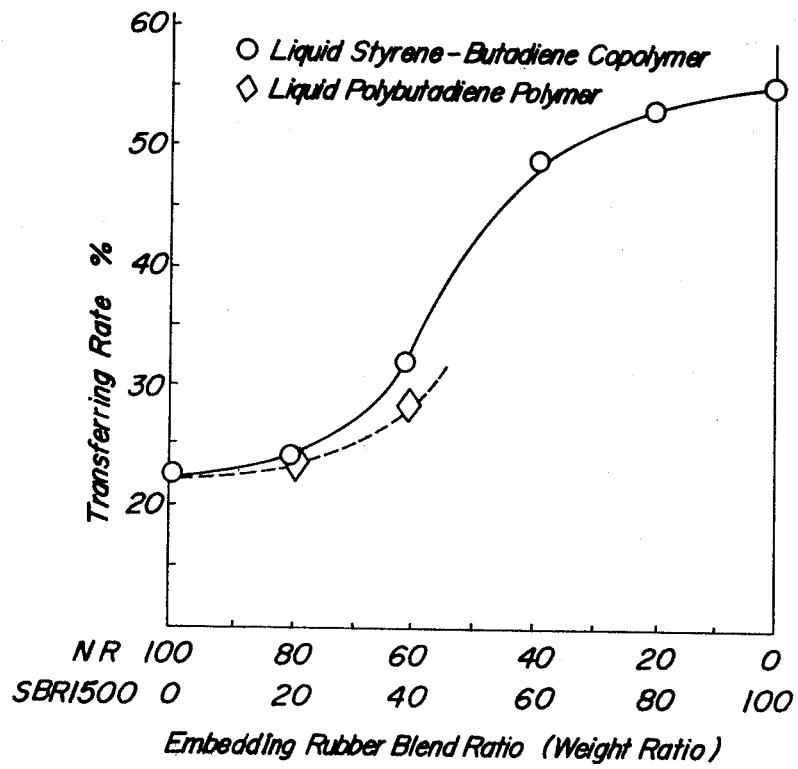
FIG. 3 is the curve for showing the transferring rate of the liquid polymer.

It is apparent from FIG. 3 that as the blend ratio of styrene-butadiene copolymer rubber in the embedding rubber increases, an amount of the liquid polymer transferred increases and when the blended ratio becomes more than 30 parts by weight, the transferring rate rapidly increases.

TABLE 1

|  | wt. part |
| --- | --- |
| Natural rubber/styrene-butadiene copolymer rubber (SBR 1500) | 100/0-0/100 |
| HAF carbon black | 50 |
| Aromatic oil | 2 |
| Cobalt stearate | 4 |
| N-phenyl-N'-isopropyl- | 0.5 |

TABLE 1-continued

| | wt. part |
|---|---|
| p-phenylenediamine | |
| Zinc white | 10 |
| Dibenzothiazyl disulfide | 1 |
| Sulfur | 5 |

TABLE 2

| | wt. part |
|---|---|
| Styrene-butadiene copolymer (SBR 1500) | 100 |
| ISAF carbon black | 50 |
| Liquid styrene-butadiene copolymer or liquid polybutadiene polymer | 30 |
| Stearic acid | 1 |
| N-phenyl-N'-isopropyl-p-phenylenediamine | 1 |
| Zinc white | 3 |
| Dibenzothiazyl disulfide | 0.3 |
| Diphenyl guanidine | 0.5 |
| N-oxydiethylene-2-benzothiazol-sulfenamide | 0.5 |
| Sulfur | 1.5 |

EXAMPLE 2

Mooney viscosity and the heat generated temperature by means of Plast meter were measured with respect to various rubber compositions shown in Table 3. These rubber compositions were vulcanized at 145° C. for 45 minutes and the resilience was determined. The Mooney viscosity was measured according to JIS K 6300, the resilience was measured according to JIS K 6301 and concerning the heat generating temperature, the rubber was kneaded at the original temperature of 70° C. and at 100 rpm, and after 15 minutes, the temperature of rubber was determined by means of Plast meter (made of Brabender Co. West Germany). The result is shown in Table 3.

By using the above described various rubber compositions for the tread and the belt cord layer wherein a steel cord layer having the structure of $1 \times 3 + 6$ is embedded in the embedding rubber shown in Table 1, TB radial tire having a tire size of 1000 R20 and a four groove pattern was produced and said tires were run on a general road (60%) and a highway road (40%) for 50,000 km. After the running, the remaining grooves of tire at the portion where the irregular wear is not caused, was measured and the wear resistance was estimated by referring No. 1 tire to be an index of 100. Accordingly, the larger value shows the higher wear resistance. Furthermore, the embedding rubber at the belt end portion after the running was taken out in the given amount and the amount of the liquid styrene-butadiene copolymer or aromatic oil transferred from the tread to the embedding rubber was determined following to Example 1 to estimate the transferring rate. The obtained result is shown in Table 3.

As seen from Table 3, when the viscosity average molecular weight of the liquid styrene-butadiene copolymer is less than $5 \times 10^3$, said copolymer readily transfers in the rubber and the wear resistance and the resilience lower. In more than $7 \times 10^4$, there is no problem in the transferring in the rubber but the heat generation of the compounded rubber under unvulcanized state is too large and the scorching phenomenon is apt to be caused and the operability lowers.

TABLE 3

| | No. 1 | No. 2 | No. 3 | No. 4 | No. 5 | No. 6 |
|---|---|---|---|---|---|---|
| SBR 1500 | 100 | 100 | 100 | 100 | 100 | 100 |
| ISAF carbon black | 50 | 50 | 50 | 50 | 50 | 50 |
| Liquid styrene-butadiene copolymer ($2 \times 10^3$) | | 15 | | | | |
| Liquid styrene-butadiene copolymer ($3 \times 10^3$) | | | 15 | | | |
| Liquid styrene-butadiene copolymer ($5 \times 10^4$) | | | | 15 | | |
| Liquid styrene-butadiene copolymer ($7 \times 10^4$) | | | | | 15 | |
| Liquid styrene-butadiene copolymer ($10 \times 10^4$) | | | | | | 15 |
| Aromatic oil | 15 | | | | | |
| Stearic acid | 1 | 1 | 1 | 1 | 1 | 1 |
| N-phenyl-N'-isopropyl-phenylenediamine | 1 | 1 | 1 | 1 | 1 | 1 |
| Zinc white | 3 | 3 | 3 | 3 | 3 | 3 |
| Dibenzothiazyl disulfide | 0.3 | 0.3 | 0.3 | 0.3 | 0.3 | 0.3 |
| Diphenyl guanidine | 0.4 | 0.4 | 0.4 | 0.4 | 0.4 | 0.4 |
| N-oxydiethylene-2-benzothiazolsulfenamide | 0.6 | 0.6 | 0.6 | 0.6 | 0.6 | 0.6 |
| Sulfur | 1.5 | 1.5 | 1.5 | 1.5 | 1.5 | 1.5 |
| Mooney viscosity (ML 1+4) | 48 | 40 | 43 | 46 | 46 | 50 |
| Heat generated temperature by means of Plast meter °C. | 135 | 121 | 127 | 132 | 135 | 149 |
| Resilience % | 41 | 38 | 40 | 42 | 43 | 45 |
| Wear resistance | 100 | 90 | 105 | 116 | 119 | 125 |
| Transferring rate into embedding rubber % | 54 | 12 | 7 | 5 | 3 | 1 |

EXAMPLE 3

With respect to various rubber compositions shown in Table 4, Mooney viscosity and the heat generated temperature by means of Plast meter were measured in the same manner as described in Example 2. Then the vulcanization was performed at 145° C. for 45 minutes and the dispersability of carbon black was determined. That is, thin pieces of length 10 mm × breadth 8 mm × thickness 5 mm obtained by cutting small rubber sample pieces refrigerated with liquid nitrogen with a microtome were observed with microscope (magnification: 100) to estimate the dispersability of the carbon black. The obtained result is shown in Table 4.

By using the above described various rubber compositions as the tread and the belt cord layer wherein the steel cord layer of the structure 1×3+6 is embedded in the embedding rubber shown in Table 1, TB radial tires having a tire size of 1000 R20 and four groove pattern were produced (the structure of only the cap is shown by C in Table 4) and the similar tires to the above described tires wherein the base rubber layer composed of the rubber composition shown in Table 5 is arranged between the ground contact area of the above described tread and the cord layer (cap/base structure is shown by C/B in Table 4), were produced. 50,000 km running test was made on general road (60%) and highway road (40%) with respect to each tire.

After the running, the wear resistance was measured in the same manner as described in Example 2 and estimated by referring No. 1 tire to be an index of 100. Concurrently, the shoulder stepdown wear amount of the tires was measured and is shown as the shoulder stepdown wear resistance and the rib edge stepdown wear amount was measured and is shown as the rib edge stepdown wear amount in Table 4.

Furthermore, the embedding rubber at the belt end after the running was taken out in a given amount and the taken out embedding rubber was boiled in a mixed solvent of acetone and chloroform (50%+50%) or THF for 48 hours and the extract was measured to estimate the rate of the liquid polymer or the aromatic oil transferred from the tread based on the original compounded amount. On the other hand, sectional cut sample at three positions on the circumference of each run tire was prepared and the degree of cracks formed at the belt end portions was observed with naked eye. The result is shown in Table 4.

TABLE 4(a)

| | 1 | 2 | 3 | 4 | 5 | 6 | 7 | 8 | 9 | 10 | 11 |
|---|---|---|---|---|---|---|---|---|---|---|---|
| NR | 100 | | | | | | | | | | 50 |
| SBR 1500 | | 100 | 100 | 100 | 100 | 100 | 100 | 100 | 100 | 100 | 50 |
| ISAF | 50 | 50 | 50 | 50 | 50 | 50 | 50 | 50 | 50 | 50 | 50 |
| Aromatic oil | 5 | 15 | | | | | | | 50 | | |
| Liquid SBR[*1] | | | 2 | 5 | 15 | 30 | 30 | 50 | | | 15 |
| Liquid IR[*2] | | | | | | | | | 15 | | |
| Stearic acid | 2 | 1 | 1 | 1 | 1 | 1 | 1 | 1 | 1 | 1 | 2 |
| 810NA[*3] | 1 | 1 | 1 | 1 | 1 | 1 | 1 | 1 | 1 | 1 | 1 |
| ZnO | 4 | 3 | 3 | 3 | 3 | 3 | 3 | 3 | 3 | 3 | 3 |
| DM[*4] | | 0.2 | 0.2 | 0.2 | 0.2 | 0.3 | 0.4 | 0.4 | 0.4 | 0.2 | 0.2 |
| DPG[*5] | | 0.4 | 0.4 | 0.4 | 0.4 | 0.5 | 0.6 | 0.6 | 0.6 | 0.4 | — |
| NOBS[*6] | 1.0 | 0.6 | 0.6 | 0.6 | 0.6 | 0.6 | 0.6 | 0.6 | 0.6 | 0.6 | 0.8 |
| Sulfur | 1.5 | 1.5 | 1.5 | 1.5 | 1.5 | 1.5 | 1.5 | 1.5 | 1.5 | 1.5 | 1.5 |
| Structure | C | C | C | C | C | C | C/B | C | C/B | C | C |
| Dispersability of carbon black | very good | good | very good | very good | good | good | good | poor | poor | good | good |

TABLE 4(b)

| | 1 | 2 | 3 | 4 | 5 | 6 | 7 | 8 | 9 | 10 | 11 |
|---|---|---|---|---|---|---|---|---|---|---|---|
| $ML_{1+4}$ | 62 | 48 | 57 | 54 | 46 | 33 | 33 | 27 | 27 | 45 | 50 |
| Heat generated temperature by means of Plast meter °C. | 126 | 135 | 147 | 140 | 132 | 125 | 125 | 119 | 119 | 130 | 132 |
| Wear resistance | 100 | 115 | 131 | 127 | 116 | 110 | 110 | 102 | 102 | 112 | 105 |
| Irregular wear | | | | | | | | | | | |
| Shoulder stepdown | 5 mm | 0.5 | 0 | 0 | 0.2 | 0.5 | 0.5 | 0.8 | 0.8 | 0.3 | 1.0 |
| Rib edge stepdown | 3 mm | 0 | 0.1 | 0 | 0 | 0 | 0 | 0 | 0 | 0.5 | 0.5 |
| Transferring rate into embedding rubber | 20% | 54% | 0.1% | 1.0% | 5.0% | 12% | 0.2% | 18% | 35% | 30% | 4.0% |
| Degree of cracks formed at beld end | no | very large | no | no | no | slight | no | slight | large | few | no |

[*1] Viscosity average molecular weight: 30,000
[*2] Viscosity average molecular weight: 30,000
[*3] N-phenyl-N'-isopropyl-p-phenylenediamine
[*4] Benzothiazyl disulfide
[*5] Diphenyl guanidine
[*6] N-oxydiethylene-2-benzothiazolsulfenamide

TABLE 5

| | part by weight |
|---|---|
| Natural rubber | 100 |
| HAF carbon black | 30 |
| Stearic acid | 2 |
| N-phenyl-N'-isopropyl-p-phenylenediamine | 1 |
| Zinc white | 6 |
| N-oxydiethylene-2-benzothiazol-sulfenamide | 0.8 |
| Sulfur | 4 |

What is claimed is:

1. In radial tires having improved irregular wear resistance, which are reinforced with a belt cord layer and a carcass cord layer, the improvement which comprises:

using natural rubber, polyisoprene rubber or a blend rubber consisting of said rubber and less than 30 parts by weight of at least one of polybutadiene rubber and styrene-butadiene copolymer rubber as an embedding rubber for the belt cord layer, which natural rubber, polyisoprene or blend rubber is vulcanized, and using a rubber composition consisting essentially of 100 parts by weight of a styrene-butadiene copolymer rubber having a viscosity average molecular weight of not less than $2 \times 10^5$ or a blend rubber consisting of more than 50 parts by weight of said copolymer rubber and at least one of natural rubber, polyisoprene rubber and polybutadiene rubber, 5-60 parts by weight of at least one of a liquid styrene-butadiene copolymer, a liquid polyisoprene polymer and a liquid polybutadiene polymer having a viscosity average molecular weight of $5\times10^3$–$7\times10^4$, which liquid styrene-butadiene polymer, liquid polyisoprene polymer or liquid polybutadiene polymer is vulcanized into a three dimensional effective network after formation of said tire, functioning as a process oil prior to said vulcanizing, and 40-90 parts by weight of a carbon black for at least the ground contact area of the tread.

2. The radial tires as claimed in claim 1, wherein a base rubber is arranged between the ground contact area of the tread and the belt cord layer.

3. The radial tires as claimed in claims 1 or 2, wherein an amount of styrene-butadiene copolymer rubber in a blend rubber used for the ground contact area of the tread is not less than 75 parts by weight among 100 parts by weight of the blend rubber.

4. The radial tires as claimed in claim 1 or 2, wherein an amount of the liquid polymer used in the ground contact area of the tread is 5-30 parts by weight.

5. The radial tires as claimed in claim 1 or 2, wherein the carbon black used for the ground contact area of the tread has an iodine adsorption value (IA) of 83-150 mg/g and a dibutyl phthalate absorption value (DBP) of 80-120 ml/100 g.

6. The radial tires as claimed in claim 2, wherein the base rubber is a rubber composition consisting essentially of 100 parts by weight of natural rubber, polyisoprene rubber or a blend rubber consisting of these rubbers and less than 20 parts by weight of polybutadiene or styrene-butadiene copolymer, 20-50 parts by weight of carbon black, and 0-10 parts by weight of a process oil.

7. The radial tires as claimed in claim 2 or 6, wherein the base rubber has a thickness less than ½ of the thickness of the tread.

8. The radial tires as claimed in claim 6, wherein the carbon black used for the base rubber is one having IA of 83-110 mg/g and DBP of 80-115 ml/100 g.

9. The radial tire as claimed in claim 1, wherein said liquid styrene-butadiene copolymer is used.

10. The radial tire as claimed in claim 1, wherein said liquid polybutadiene polymer is used.

* * * * *